D. WILSON.
EARTH AUGER.
APPLICATION FILED FEB. 4, 1911.

1,035,289.

Patented Aug. 13, 1912.

WITNESSES:
R. E. Hamilton
E. B. House

INVENTOR.
David Wilson
BY
Warren D. House
His ATTORNEY.

D. WILSON.
EARTH AUGER.
APPLICATION FILED FEB. 4, 1911.

1,035,289.

Patented Aug. 13, 1912.
6 SHEETS—SHEET 3.

WITNESSES:

INVENTOR.
David Wilson
BY Warren D. House
His ATTORNEY.

D. WILSON.
EARTH AUGER.
APPLICATION FILED FEB. 4, 1911.

1,035,289.

Patented Aug. 13, 1912.
6 SHEETS—SHEET 5.

WITNESSES:

INVENTOR.
David Wilson
BY Warren D. House
His ATTORNEY.

D. WILSON.
EARTH AUGER.
APPLICATION FILED FEB. 4, 1911.

1,035,289.

Patented Aug. 13, 1912.
6 SHEETS—SHEET 6.

WITNESSES:
R L Hamilton
E. B. House

INVENTOR.
David Wilson
BY
Warren D. House
His ATTORNEY.

UNITED STATES PATENT OFFICE.

DAVID WILSON, OF KANSAS CITY, MISSOURI.

EARTH-AUGER.

1,035,289.     Specification of Letters Patent.     Patented Aug. 13, 1912.

Application filed February 4, 1911. Serial No. 606,573.

*To all whom it may concern:*

Be it known that I, DAVID WILSON, a citizen of the United States, residing at Kansas City, in the county of Jackson and State of Missouri, have invented certain new and useful Improvements in Earth-Augers, of which the following is a specification.

My invention relates to earth augers for use in digging wells, or holes for the planting of piles, telegraph poles, etc., one of the principal objects of my invention being to provide an apparatus which may be mounted on a suitable road truck or railway car, so that it may have adjustable movement on the car when the latter is stationary, in order that a number of digging operations may be performed without moving the car.

It is a further object of my invention to provide means for removing earth from the hole simultaneously with the operation of the digging parts.

It is a further object of my invention to provide an apparatus wherein provision is made for setting tubular stays within the hole to obviate caving when the apparatus is working in soft earth or encounters a stratum of sand below the surface.

It is a further object of my invention to provide an apparatus of this character wherein the driving parts may be separated, so that the tubular stays, before mentioned, may be applied to the drill shaft.

Other objects of my invention will become apparent from the following description, wherein reference is had to the accompanying drawings, in which:—

Referring more in detail to the parts:— 1 designates a carrying truck which is mounted on the wheels 3, here shown to be wide tread heavy truck wheels adapted for traveling on ordinary roadways. On the top of truck 1 are bearing brackets 4, within which are revolubly mounted the horizontal rollers 5, which may be of any suitable number and spaced at intervals throughout the length of the truck. Mounted on the rollers 5 is a platform 6 having two longitudinal parallel side members 7 which are provided with flanges 8. Fixed to the truck 1 are standards 9 having inwardly directed stub shafts 10 carrying rollers 11 which overlie and engage the upper faces of the platform flanges 8, for the purpose of holding the platform to the truck without materially interfering with the travel of the platform on the rollers 5. There may be a suitable number of the keeper rollers arranged throughout the length of the truck, although I prefer to limit the number to one at each corner of the truck. Mounted on the forward end of platform 6 is a guide frame 12 comprising a pair of spaced side members, which extend to a suitable height above the platform and are joined by a cross member 13 at the top.

14 designates a head which is located between the guide members 12 and has arms 15 extending laterally in the direction of the guide members and provided with lips 16 that extend thereover. In the upper part of the members 12 are apertures 17, and in the lips 16 are apertures through which, and through the apertures in the upper parts of the guide members, pins 18 are projected for the purpose of supporting the head in an adjusted position. In the head 14 is a slide bearing 19 and a threaded bore 20, through which a threaded rod 21 is projected, said rod having a circular head 22 at its lower end, of which more will be said hereinafter, and a longitudinal feather groove 23. Mounted on the rod 21, so as to slide thereover, and located between the top of the slide bearing 19 and inner face of the threaded bearing 20 of the head 14 is a beveled gear wheel 24 having a feather 25 projected into the groove in rod 21, so that the gear may slide longitudinally on the rod, but be held against revolution thereon. Revolubly mounted in bearings 24' at one side of head 14 is a shaft 26. Fixed on the inner end of shaft 26 and meshing with the gear 24 on rod 21, is a beveled gear 27; also fixed on shaft 26 is a gear 28 which latter meshes with a gear 29 on a shaft 30 that is revolubly mounted in bearings 31 at the rear of the frame. Fixed on shaft 30 is a beveled gear 32 which meshes with a similar gear 33 which is feathered on a vertical shaft 34 revolubly mounted in a bearing 35 at the top of the guide frame and in a bearing socket 35' on the platform 6. On the lower end of shaft 34 is a beveled gear 36, which meshes with a similar gear 37 on a counter shaft 38, revolubly mounted in bearings 39 on the platform 6. Fixed on the shaft 38 is a series of graduated gears 40, which are adapted to mesh with the gears 41 on a sleeve 42, feathered on a drive shaft 43 revolubly mounted in bearings 44 on platform 6.

45 designates a shipper lever which is horizontally mounted on the platform and adapted for shifting the sleeve 42 to regulate the speed at which the vertical shaft 34 is driven.

On the drive shaft 43 is a sprocket 46 which is connected with a sprocket 47 on an engine shaft 48 by a chain belt 49.

50 designates the engine which may be of any suitable type, but preferably of light weight, so that it may be carried easily on the platform 6. Also located between the guide members 12, below the head 14, is a head 51 having side arms 52 extending toward the guide members and provided with lips 53 for embracing the side members and guiding the head. Fixed to the top of head 51, by bolts 54, is an inverted cup shaped member 55, having a central aperture 56. Located within the cup is the head 22 of the threaded rod 21, the shank portion of the rod being extended through the cup aperture 56, and the fitting of these parts being loose, so that the rod and head may have free revoluble movement in the cup.

With the mechanism described, it is apparent that the threaded rod is revolved through the gearing and shaft 34 from the engine, and, having threaded connection with the fixed head 14, will force the lower head 51 downwardly through the engagement of the rod head 22 therewith.

Revolubly mounted in the head 51 is a vertical shaft 57, and fixed on said shaft, within a pocket 58 in the head 51, is a horizontally arranged spur-gear 59 which is preferably of substantial diameter and meshes with a small gear 59' that is feathered on a vertical shaft 60 revolubly mounted in a bearing 61 on the bracket 62 that extends rearwardly from the upper portion of the guide frame 12, and in a bearing socket 61' on the platform 6. Fixed on the lower end of shaft 60 is a beveled gear 63 which meshes with a gear 64, which is secured on a shaft 65 that is revolubly mounted in bearings 66 on the platform 6. Revolubly mounted on said shaft is a sprocket 67 which is connected with a sprocket 68 on the engine shaft 48, by a belt 69. Feathered on the shaft 65 is a clutch member 70 which is adapted to take into a clutch member on sprocket 67 for the purpose of revolving said shaft, when desired.

71 designates a shipper lever which is pivotally mounted on platform 6 and is adapted for shifting the feathered clutch into and out of mesh with the clutch member on the sprocket.

Removably mounted in the lower part of head 51 is a bearing block 73 which is preferably held to the block by means of bolts 74. Revolubly mounted in a collar 75 at the lower end of the block 73 is a drill shaft 76, the upper end of which is provided with a squared shank 77 which is projected into a socket 78 in the shaft 57 that carries the drive gear 59. The lower end of shaft 76 is provided with a square portion 79 and with a threaded tip 80. Fixed on the lower portion of shaft 79 is a collar 81, on the periphery of which are mounted the auger blades 82, having horizontal cutter blades 83 at their lower edges and vertical knives 84 at their outer edges running back from the horizontal blades 83. The rear edges of each of the auger blades terminates above and short of the lower cutting edge of the opposite blade to provide a vertical space therebetween. Secured to collar 81 are brackets 85 having arms 86 projecting laterally into the space between the vertical planes of the opposite spirals and having yokes 87, in which are pivotally mounted the bell crank teeth 88, the lower members 89 of which are provided with cutting edges that are adapted to project laterally beyond the circumferential planes of the spirals. Fixed on the arms 86 are flat springs 90, which engage the inner members 91 of the bell crank teeth 88 and yieldingly tension said members, so that the cutting teeth are held yieldingly in the position mentioned. Fixed on the lower end of the drill shaft 76 is a nose 92, having the spiral cutting blades 93 which are adapted for opening up the auger hole in the usual manner.

With this mechanism it is apparent that the earth will be loosened, cut and elevated by the spirals, in the manner common to an ordinary earth auger, and that when the bit, just described, is working in the earth or sand, the springs 90 will rock the bell crank teeth 88 outwardly beyond the circumferential plane of the spiral blades, so that a larger bore is made, for a purpose presently set forth.

Referring now to the elevator mechanism, 94 designates a tube which is carried on the drill shaft and rests at its lower end on the bit collar, being spaced from the shaft by the collars 95. At its upper end, tube 94 has a cup member 96 projected over the collar 75 of the head block 73 and fixed thereto, preferably by set screw 97. Fixed on the lower end of tube 94 and also resting on the top of the bit collar 81 is a frame 98 comprising arms 99 which are spaced from the bottom of the frame to provide downwardly opening channels 100. Journaled in the bottom of the frame and in arms 99 are shafts 101 and fixed to said shafts, within the channels, are the sprocket wheels 102. Integral with the block 73, in the lower head 51, are the arms 103, which are spaced from the bottom of the block to provide the upwardly opening channels 104. Journaled in the block 73 and arms 103 are the shafts 105 which extend laterally beyond the arms and are also journaled in the sides of the head 51, being extended through an open space between the arms and head sides. Fixed on the shafts 105, within the channels 104, are sprockets 106, and running over the sprockets 106 and lower sprockets 102 are belts 107, which carry conveyer buckets 108. It is apparent that with the lower sprockets mounted in close proximity to the auger bit, that the loose earth turned up by the bit, will be elevated by the buckets so as to clear the hole as the latter is formed.

I prefer to fix the buckets rigidly on the belts and to provide a clean-out for each bucket, comprising a plate 109 which is located within the bucket and hinged on a pin 110 at the rear upper edge thereof and provided with a back turned lip 111 for engaging a lug 112 on the head block 73, so that as the buckets turn over the upper sprockets the clean-outs will be operated to remove material from the buckets.

To operate the elevator I provide each of shafts 105 with a fixed beveled gear 113 which meshes with a beveled gear 114 revolubly mounted on the shaft 57, near the top of the head 51 and above the elevator mechanism. Beveled gear 114 has a hub 115 provided with gear teeth 116, which mesh with a large gear 117 which is feathered on the shaft 60 that carries the gear for operating the drill shaft; the large and small gears for actuating the elevator and drill shaft being arranged oppositely in order to drive the elevator at a higher speed than the drill shaft, so that the hole may be kept clear of earth.

In order that the gears 59' and 117 may retain their engagement with the drill shaft and elevator gears while the latter are moved downwardly during the progress of the work, I provide a traveling frame 118 which is preferably integral with the head 51 and is adapted for sliding over the drive shaft 60, having arms 119 and 120 engaging the upper and lower faces of the gears 59' and 117 respectively, so that said gears are moved either upwardly or downwardly in their feathered engagement with the drive shaft during a relative movement of the head 51 and drill parts.

It is apparent that in digging a deep well or hole that it will be necessary to use more than one section of drill shaft and tube 94, and for this reason I have provided shafts and tubes of the construction illustrated in the drawings and provide members having sockets at one end and shank portions at the other end for taking into said sockets, and means for securely fixing the sections together. In order to introduce a new section of shaft or tube it is necessary, however, to separate such parts from the operating mechanism, and I have provided for this separation by providing head 51 with the removable block 73, arranging a joint of the drill shaft above the elevator drive shaft and sectioning the elevator drive shafts. In detail this latter construction consists of a shaft section 105' that is carried by the block 73 and arms 103 and is provided with a groove 121, the main section of the shaft being provided with a tongue 122 for seating in a groove 121, so that when the parts are together the shaft will operate in the usual manner, but in which the sections may be separated by drawing the main shaft sections away from the inner sections.

Figure 1:
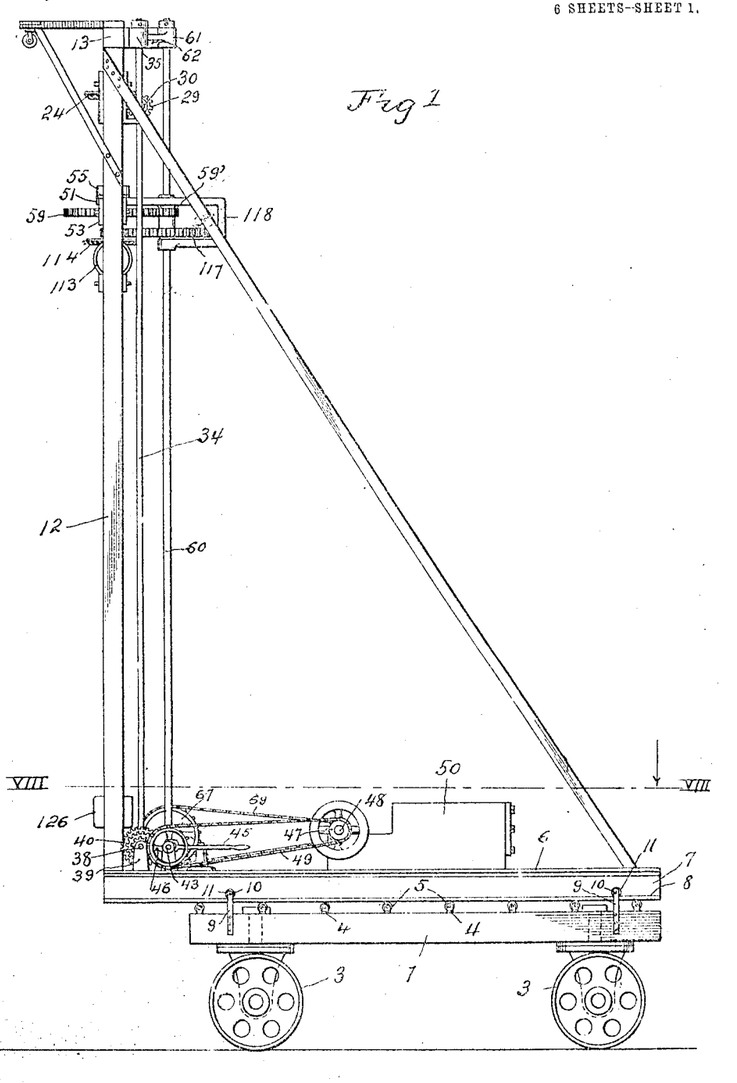
Figure 1 is a side view of an earth auger constructed according to my invention.
Figures 2, 9, 15, 16, 17:
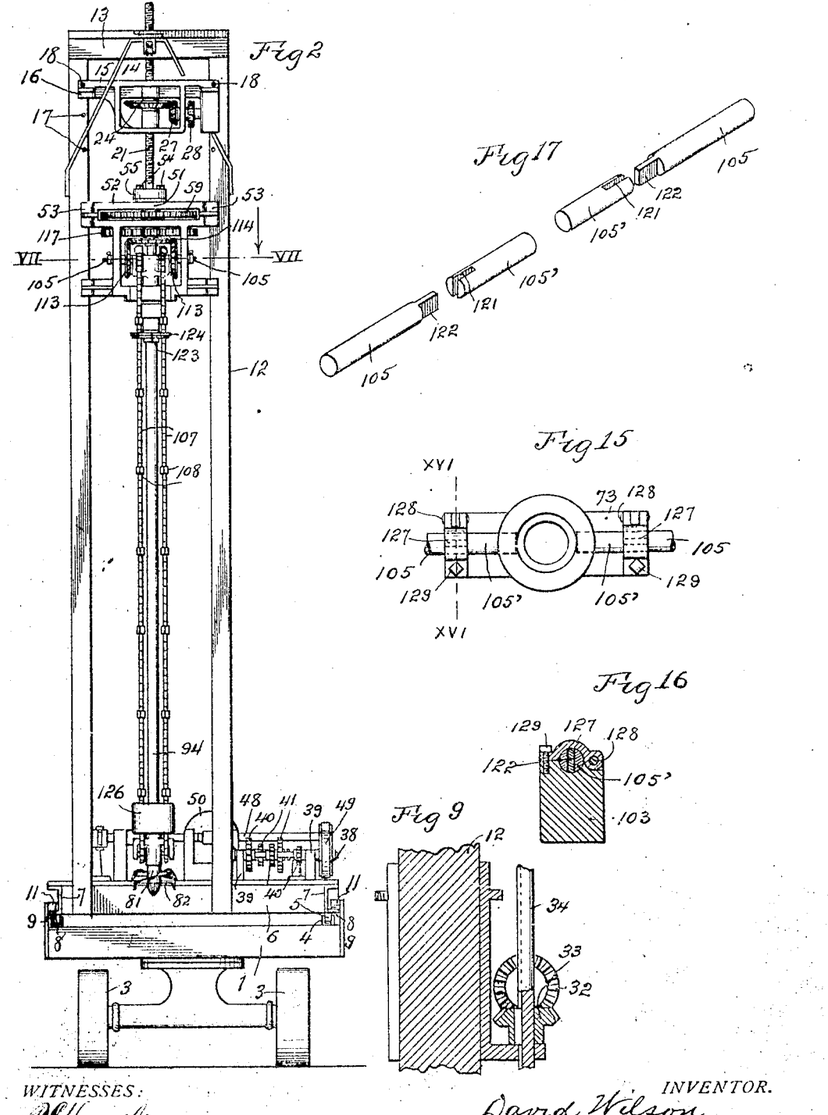
Fig. 2 is a front elevation of same.
Fig. 9 is a detail view of the initial transmission from the vertical drive shaft to the drill shaft in section on the line IX—IX, Fig. 3.
Fig. 15 is a plan view of the mounting for the horizontal elevator shafts, showing a portion of said shafts.
Fig. 16 is a vertical section on the line XVI—XVI, Fig. 15, showing the joint of the sectional sprocket shaft.
Fig. 17 is an enlarged detail view of said shaft, showing the parts spaced from each other.
Figure 3:
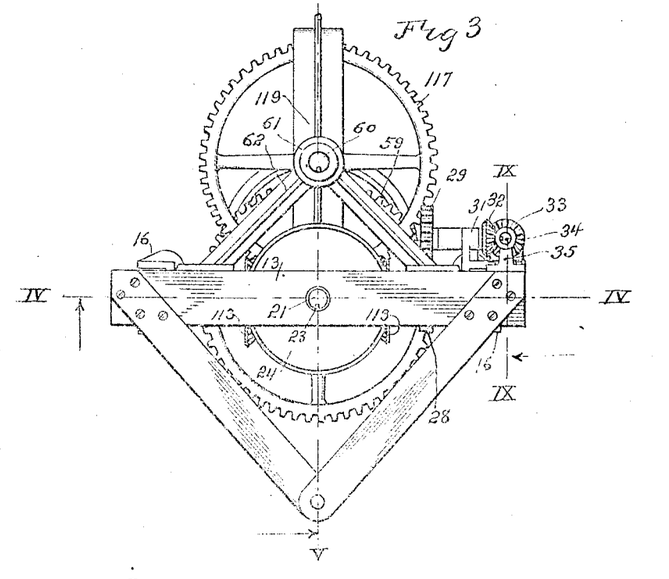
Fig. 3 is a plan view of the guide frame and drilling parts.
Figures 4, 18, 19:
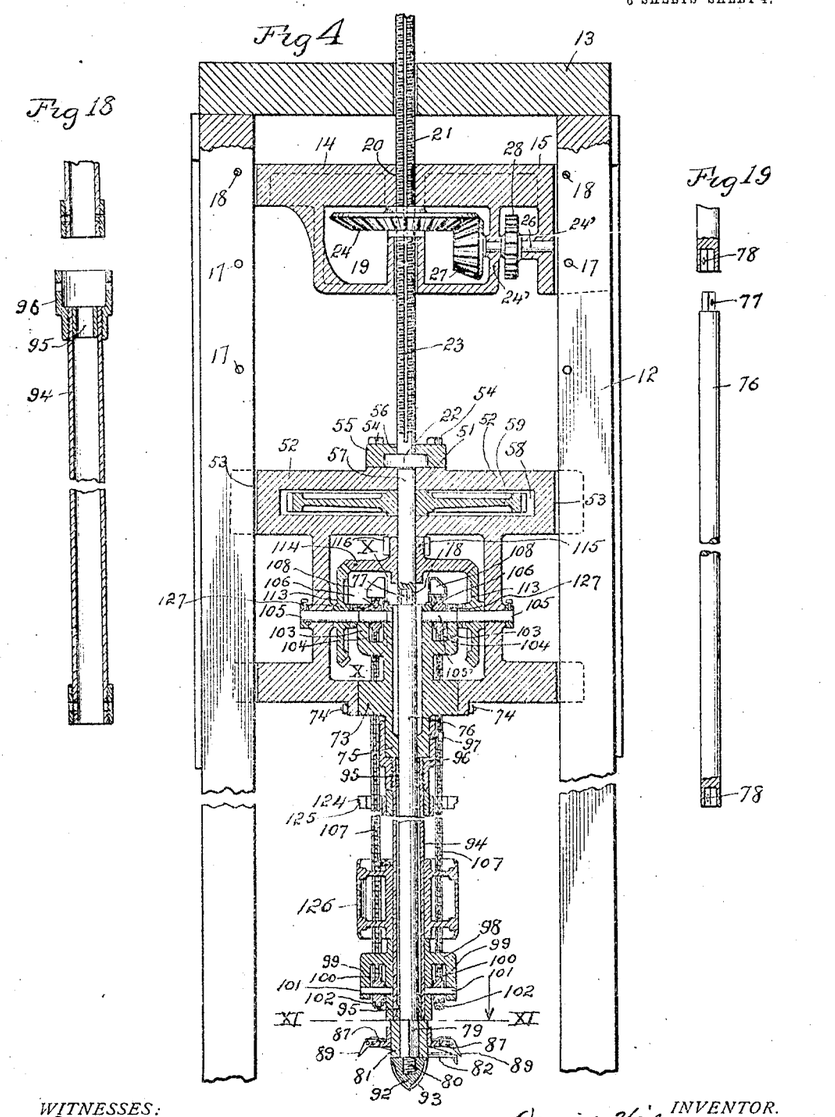
Fig. 4 is a vertical section of same on the line IV—IV, Fig. 3, showing the parts in front elevation.
Fig. 18 is an enlarged detail view of the sectional, tubular mounting for the elevator parts.
Fig. 19 is a similar view of the drill shaft.
Figure 5:
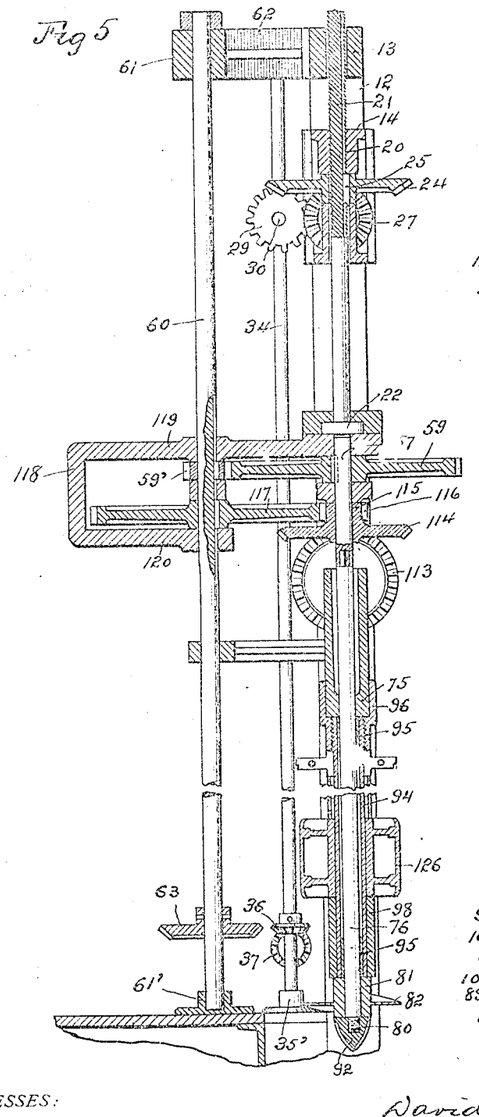
Fig. 5 is a similar view on the line V—V, Fig. 3, showing the parts in side elevation.

As shown in Figs. 4, 15 and 16, the upper ends of the arms 103 have hinged to them respectively, by horizontal pintles 128, box caps 127, which with the arms 103 form journal boxes in which the shaft sections 105 and 105′ are rotatively mounted. Screws 129 extend through the caps 127 respectively and respectively engage screw threaded holes provided in the upper ends of the arms 103. By removing the screws 129 from the holes in the arms 103, the caps 127 may be swung to positions in which the sections 105 may be detached from the sections 105′, in order that the head 51 may be raised from the block 73, after the bolts 74 have been removed, as hereinafter described, for the purpose of inserting additional sections of drill shafts and tube sections.

It is often the case that in drilling wells or holes for piles or poles, strata of very soft earth or sand are encountered, so that the holes will cave and make the work very difficult; to overcome this difficulty it is my purpose to sink casing sleeves 122′ of suitable material and size into the hole to cover the soft strata and prevent caving; such sleeves being of the same diameter as the upper bit blades and adapted to ride thereon when being set in place, and of slightly greater diameter than the fixed bore of the hole, so that the well tubing, piles or pole may be set therethrough. In order to force the sleeve into place, I provide the drill tube with a fixed abutment collar 123 having an outer flange 124 provided with a shoulder 125, within which the upper end of the sleeve is adapted to seat, this collar being formed in two sections and bolted together so that the parts may be taken from the tube when the sleeve is to be inserted, and fixed rigidly to the tube over the sleeve as is clearly illustrated in Fig. 6. It is apparent that with this construction the sleeve 122′ will be forced downwardly into the hole during the progress of the digging operation and that when the bit and drill shaft are withdrawn the former may be lifted through the tube for the reason that the fixed bit spirals are of less diameter than the sleeve and will pass freely therethrough and the loose teeth will yield downwardly against the tension of their holding springs, so as to pass within the sleeve. In order to guide the sleeve into place, I provide the drill tube with a guide collar 126 which is preferably of the same diameter as the fixed bit spirals and carried rigidly on the lower end of tube 94.

In using my improved apparatus, presuming the platform to be mounted on a suitable truck, adapted for travel on a roadway or railway track, the forward portion of the platform is moved so that it will clear the front end of the truck and the bit lowered onto the ground and revolved through the driving mechanism previously described, the loose bit teeth cutting a top ring of earth above the fixed teeth, of slightly greater diameter that the bore of said fixed parts. Simultaneously with the operation of the bit the conveyer chain is actuated so that the buckets are lowered into the hole and lifted in the usual manner; the present mechanism comprising the double chains arranged in opposite sides of the center of the drive gear, so that the chains are operated in opposite directions and thereby serve, to a slight extent, to balance the strain, although I do not wish to be limited to this exact method of operation. Simultaneously with the actuation of the bit and elevators, the rod 21, which is threaded into the head 14 at the top of the guide frame, is actuated through its shaft and gearing, so that the lower head 22 is lowered against the top of the head 51 and moves the drill and elevator parts downwardly into the ground, the speed at which the various parts are driven, being controlled by the change gear mechanism on the carrying platform. After the drill parts have been moved downwardly a substantial distance, the upper head 14 may be disconnected with the guide members and lowered therein, so that the operation of the drill parts may be continued, the adjustment of the head and guide members being accomplished through the pin and aperture combination heretofore described.

Figure 6:
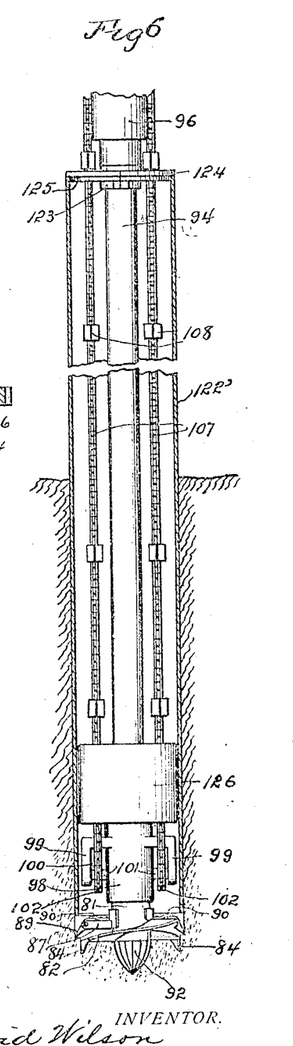
Fig. 6 is an enlarged detail view of the lower part of the auger, showing its digging operation and illustrating the use of the well lining.
Figure 7:
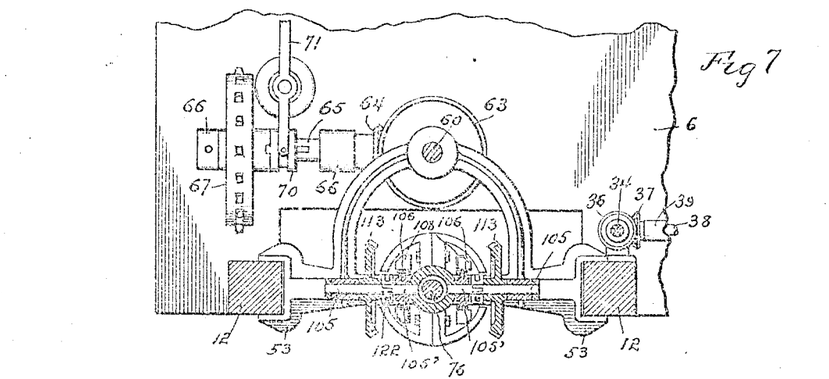
Fig. 7 is an enlarged horizontal section on the line VII—VII, Fig. 2, showing the elevator sprockets and driving parts and the sectional shaft by means of which the drilling parts may be disjointed.
Figure 8:
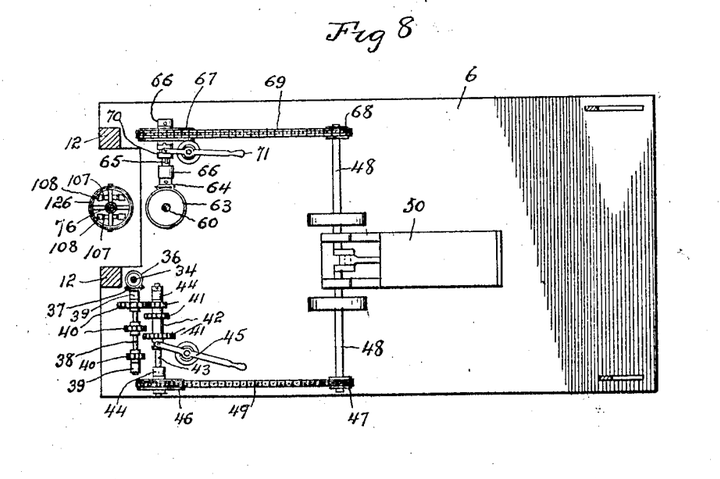
Fig. 8 is a plan view of the auger carriage and driving mechanism, the drill parts being in section on the line VIII—VIII, Fig. 1.
Figure 10:
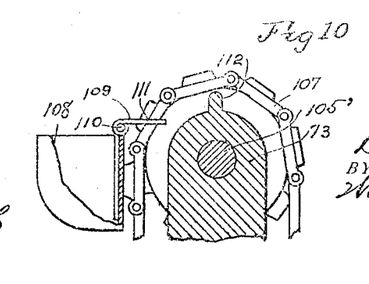
Fig. 10 is an enlarged detail view of the elevator sprocket and chain on the line X—X, Fig. 4, illustrating one of the sprockets and the cleanout, with its tip.
Figures 11, 13:
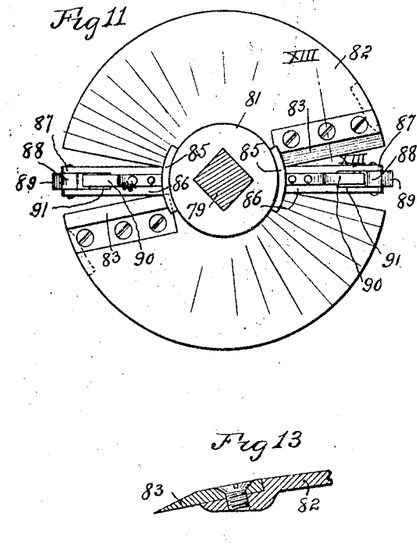
Fig. 11 is an enlarged plan view of the drill bit, the shaft being in section on the line XI—XI, Fig. 4.
Fig. 13 is an enlarged detail of a portion of the bit and one of the blades in cross section on the line XIII—XIII, Fig. 11.
Figure 12:
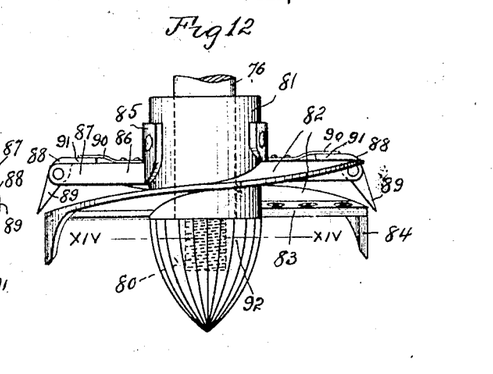
Fig. 12 is a side elevation of same.
Figure 14:
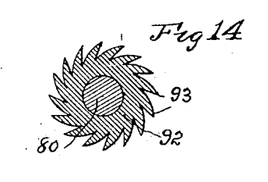
Fig. 14 is a horizontal section of the bit nose on the line XIV—XIV, Fig. 12.

In digging a deep hole it is necessary to use successive sections of drill shaft and tube, and when it is necessary to provide a new section, I break the shaft in the lower head 51 by withdrawing the outer sections of shafts 105 that carry the beveled gears which engage the driving gear 114, and disconnect the head block 73 by removing the bolts 74. The head 51 may then be raised in the guide members and the frame moved backwardly to expose the portion of the drill shaft projecting above the ground and a new section of shaft and tubing applied, after which the parts may be reassembled and the drilling operation continued. Should a stratum of soft earth or sand be encountered so that the sides of the well or hole would cave, and it be necessary to drop the protecting sleeve into the hole, the parts are separated in the same manner as when a new drill shaft section is to be supplied, the collar 123 is taken off of the shaft, the sleeve section is dropped over the drill shaft and elevator belts, and the collar 123 again fastened in place so that upon further operation of the drill the sleeve will be forced downwardly into the hole as illustrated in Fig. 6, the guide collar 126 on the lower end of the drill shaft actuating as a guide for holding the lower end of the tube in position, so that it may be lowered evenly into place. A sleeve of sufficient length to cover the required area is supplied and in some instances the drilling may continue below this area without further protection.

With the sleeve in place, when the drill is to be removed, the loose bit teeth will engage the lower edge of the sleeve and be rocked against the tension of their holding springs, so that the teeth may collapse sufficiently to allow them to be drawn upwardly through the interior of the tube, the lower bit teeth, being of less diameter than the sleeve, will pass readily therethrough.

Having thus described my invention, what I claim as new therein and desire to secure by Letters-Patent is:—

1. The combination with a truck having transverse rollers thereon, of a platform having two longitudinal parallel side members having lateral flanges and mounted on said rollers, standards on the truck having rollers engaging the lateral flanges, an auger mechanism mounted on one end of the platform and comprising a vertical drill shaft adapted for projection in front of the truck, and means carried on the platform for actuating said shaft.

2. An earth auger comprising a drill shaft, a guide collar fixed on said shaft, near its free end, a tube driving collar fixed on said shaft above the guide and having an inset peripheral shoulder, and a bit carried by said shaft and having yieldable teeth.

3. An earth auger comprising a drill shaft having a bit provided with fixed teeth and with yieldable teeth, the yieldable teeth being located above, and having a greater diameter than the fixed teeth, a guide collar fixed on said shaft and having a diameter less than that of the yieldable bit teeth, and a sectional, tube-driving collar fixed on said shaft above the guide and having a peripheral shoulder.

4. An earth auger comprising a guide frame, a head longitudinally movable on said frame, a shaft section permanently mounted in said head, a block removably fixed in said head, a drill shaft journaled in said block and connected with said shaft section, and separate means for imparting revoluble movement to the shaft section and longitudinal movement to the head.

5. An earth auger comprising a guide frame, a head longitudinally movable on said frame and having a block portion adapted for removal therefrom, a shaft section revolubly mounted in said head, a drill shaft journaled in said block portion and connected with said shaft section, sectional shafts mounted in said block portion and head and extending at a right angle to the drill shaft, conveyers mounted on said sectional shafts and on a lower part of the drill shaft, means for actuating said sectional shafts, and means for actuating the drill shaft.

6. An earth auger comprising a guide frame, a head adapted for longitudinal movement in said frame and comprising a removable block member, a shaft section carried by said head, a drill shaft journaled in the block member and connected with the shaft section, a shaft member journaled in said block portion and provided with a transverse groove, a conveyer mounted on said shaft member and on a lower part of the drill shaft, a shaft member journaled in said head and having a tongue projected into the groove in said conveyer shaft member, means for actuating said sectional shaft, and means for actuating the drill shaft.

7. An earth auger comprising a guide frame, a head adapted for longitudinal travel in said frame, a drill shaft journaled in said head, a gear fixed on said drill shaft, transverse conveyer shafts journaled in said head, beveled gears fixed on said shafts, a beveled gear loose on the drill shaft and engaging said conveyer shaft gears, and means for actuating said gears, for the purpose set forth.

8. An earth auger comprising a guide frame, a head adapted for longitudinal travel in said frame, a drill shaft extended into said head, a conveyer mounted at one end on the drill shaft, a gear fixed on said shaft, a gear loose on said shaft, transmission between the loose gear and conveyer, a shaft revolubly mounted in parallel relation to the drill shaft, gears mounted for longitudinal travel, but not for revoluble movement on said parallel shaft and adapted for engaging the drill and conveyer gears respectively, and means for actuating said parallel shaft.

9. An earth auger comprising a guide frame, a head adapted for longitudinal travel in said frame, a drill shaft extended into said head, a conveyer mounted at one end on the drill shaft, a gear fixed on said shaft, a gear loose on said shaft, transmission between the loose gear and conveyer, a shaft revolubly mounted in parallel relation to the drill shaft, gears mounted for longitudinal travel, but not for revoluble movement on said parallel shaft and adapted for engaging the drill and conveyer gears respectively, means for moving said head longitudinally, and means for moving the parallel shaft gears simultaneously with the movement of said head.

10. An earth auger comprising a guide frame, a head adapted for longitudinal travel in said frame, a drill shaft extended into said head, a conveyer mounted at one end on the drill shaft, a gear fixed on said shaft, a gear loose on said shaft, transmission between the loose gear and conveyer, a shaft revolubly mounted in parallel relation to the drill shaft, driving gears mounted for longitudinal travel, but not for revoluble movement on said parallel shaft and adapted for engaging the drill and conveyer gears respectively, means for moving said head longitudinally, and a frame on said head having portions extending above and below the parallel shaft gears and adapted for moving same in unison with said head.

11. An earth auger comprising a frame, a head longitudinally movable in said frame, a drill shaft journaled in said head, a head vertically adjustably fixed in said frame above the movable head, a shaft having operative connection with said fixed head and actuating connection with the movable head, and separate means for actuating said last named shaft and said drill shaft.

12. An earth auger comprising a guide frame, a head longitudinally movable in said frame, a drill shaft connected with said head, means for actuating the drill shaft, a head carried by said frame above the movable head, a shaft having threaded connection with the upper head and rotatively but not longitudinally movable in the movable head, a gear wheel adapted for longitudinal, but not for revoluble travel on said last named shaft, and means for actuating said gear wheel.

13. An earth auger comprising a guide frame, a head longitudinally movable in said frame, a drill shaft connected with the movable head, an actuating shaft vertically movable in the frame and the movable head, two driving shafts, operative connection between one of said driving shafts and the drill shaft, operative connection between the other driving shaft and the vertically movable shaft, and means for actuating said driving shafts.

14. In an earth auger, a drill shaft, a protecting tube through which the drill shaft extends, a guide collar secured to said tube, and an abutment collar detachably secured to the protecting tube above the guide collar.

15. In an earth auger, a drill shaft, a protecting tube through which the drill shaft extends, a guide collar secured to said tube, and an abutment collar comprising two sections and having means by which said sections are detachably secured together and to the said tube above the guide collar.

16. In an earth auger, a drill shaft, a protecting tube through which the drill shaft extends, and an abutment collar secured to the said tube for engaging and forcing downwardly a casing tube.

17. In an earth auger, a drill shaft, a protecting tube through which the shaft extends, and an abutment collar comprising two sections and having means by which the sections are detachably secured together and to the tube.

18. In an earth auger, a guide frame, a vertically movable head mounted on said frame, a drill shaft, a drill protecting tube through which the shaft extends, means for detachably securing the tube and shaft to said head, and an abutment device detachably secured to said tube.

19. In an earth auger, a guide frame, a head vertically movable on the frame, a drill shaft, a drill protecting tube through which the shaft extends, means for detachably securing the tube and shaft to the head, a guide collar secured to the tube, and an abutment device secured to the tube above the said collar.

20. In an earth auger, a guide frame, a head vertically movable on the frame, a drill protecting tube, means for detachably securing the tube to the head, and an abutment device secured to the tube and adapted to engage the upper end of a casing tube.

21. In an earth auger, a guide frame, a head vertically movable on the frame, a drill protecting tube, means for detachably securing the tube to the head, and an abutment device detachably secured to the tube for engaging the upper end of a casing tube.

22. In an earth auger, a guide frame, a head vertically movable on the frame, a drill protecting tube, means for detachably securing the tube to the head, a guide collar secured to the tube, and an abutment device detachably secured to the tube above the collar for engaging the upper end of a casing tube.

23. In an earth auger, a guide frame, a head vertically movable on the frame, a drill protecting tube, means for detachably securing the tube to the head, a guide collar secured to the tube, and an abutment collar comprising two sections and having means for detachably securing the sections to each other and to the tube.

In testimony whereof I have signed my name to this specification in presence of two subscribing witnesses.

DAVID WILSON.

Witnesses:
  E. B. HOUSE,
  FLORENCE M. VENDIG.